United States Patent
Takano

(10) Patent No.: US 10,840,773 B2
(45) Date of Patent: Nov. 17, 2020

(54) ROTARY ELECTRIC MACHINE WITH A STATOR HAVE A FRAME AND A CORE WITH HAVING THEIR MATERIAL MIXED AT JOINT

(71) Applicant: FANUC CORPORATION, Yamanashi (JP)

(72) Inventor: Shinobu Takano, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 9 days.

(21) Appl. No.: 15/978,228

(22) Filed: May 14, 2018

(65) Prior Publication Data

US 2018/0351435 A1    Dec. 6, 2018

(30) Foreign Application Priority Data

May 30, 2017    (JP) .................................. 2017-106715

(51) Int. Cl.
| | |
|---|---|
| *H02K 9/22* | (2006.01) |
| *H02K 5/18* | (2006.01) |
| *H02K 3/34* | (2006.01) |
| *H02K 3/12* | (2006.01) |
| *H02K 15/02* | (2006.01) |
| *H02K 9/00* | (2006.01) |
| H02K 15/14 | (2006.01) |

(52) U.S. Cl.
CPC .................. *H02K 9/22* (2013.01); *H02K 3/12* (2013.01); *H02K 3/345* (2013.01); *H02K 5/18* (2013.01); *H02K 9/005* (2013.01); *H02K 15/026* (2013.01); *H02K 15/14* (2013.01)

(58) Field of Classification Search
CPC ............ H02K 1/185; H02K 1/18; H02K 9/22; H02K 5/04; H02K 5/00; H02K 5/02; H02K 5/06; H02K 5/08; H02K 7/09; H02K 5/18; H02K 15/026; H02K 15/14
USPC .......................... 310/89, 415, 431–433, 427
See application file for complete search history.

(56) References Cited

U.S. PATENT DOCUMENTS

| | | | | |
|---|---|---|---|---|
| 493,337 | A | * | 3/1893 | Parshall ................. H02K 15/12 310/265 |
| 1,771,475 | A | * | 7/1930 | Wright ................... H02K 1/185 310/415 |

(Continued)

FOREIGN PATENT DOCUMENTS

| | | |
|---|---|---|
| CN | 103915919 A | 7/2014 |
| CN | 203883564 U | 10/2014 |

(Continued)

OTHER PUBLICATIONS

JP2010178598 English Translation (Year: 2010).*
An Office Action mailed by the Japanese Patent Office dated Oct. 9, 2018, which corresponds to Japanese Patent Application No. 2017-106715 and is related to U.S. Appl. No. 15/978,228; with partial English translation.

(Continued)

*Primary Examiner* — Maged M Almawri
(74) *Attorney, Agent, or Firm* — Studebaker & Brackett PC

(57) ABSTRACT

A stator includes: a substantially cylindrical core allowing arrangement of a winding inside the core; and a stator frame joined to the outer lateral surface of the core through a joint. The joint is formed at least at a part of a boundary where the outer lateral surface of the core and the inner lateral surface of the stator frame are in contact with each other. A material forming the core and a material forming the stator frame are mixed at the joint.

6 Claims, 7 Drawing Sheets

(56) References Cited

U.S. PATENT DOCUMENTS

| | | | | |
|---|---|---|---|---|
| 1,795,882 A * | 3/1931 | Noden | H02K 1/185 | 310/433 |
| 2,001,799 A * | 5/1935 | Seyfried | H02K 1/185 | 310/429 |
| 2,023,259 A * | 12/1935 | Anderson | H02K 1/185 | 310/402 |
| 2,251,674 A * | 8/1941 | Gillen | H02K 17/10 | 310/172 |
| 2,478,316 A * | 8/1949 | Potter | H02K 1/185 | 310/216.131 |
| 2,523,520 A * | 9/1950 | Reinhard | H02K 1/185 | 310/402 |
| 2,711,492 A * | 6/1955 | Ballman | H02K 1/185 | 310/216.132 |
| 2,876,371 A * | 3/1959 | Wesolowski | H02K 1/16 | 310/216.129 |
| 2,939,021 A * | 5/1960 | Gilchrist | H02K 1/185 | 310/216.133 |
| 2,977,491 A * | 3/1961 | Hueffed | H02K 1/185 | 310/414 |
| 4,227,109 A * | 10/1980 | Mulach | H02K 1/16 | 310/216.114 |
| 4,765,054 A * | 8/1988 | Sauerwein | H02K 1/185 | 29/596 |
| 5,015,904 A * | 5/1991 | Kleemann | H02K 3/325 | 310/179 |
| 5,319,270 A * | 6/1994 | Tanaka | H02K 21/16 | 310/67 R |
| 5,742,991 A * | 4/1998 | Kurth | B29C 45/1747 | 254/29 A |
| 5,793,136 A * | 8/1998 | Redzic | H02K 16/02 | 310/112 |
| 5,796,190 A * | 8/1998 | Takeda | F02B 63/04 | 310/112 |
| 5,821,647 A * | 10/1998 | Takehara | G02B 26/121 | 310/67 R |
| 5,850,679 A * | 12/1998 | Hoffman | B25B 27/026 | 29/252 |
| 5,949,169 A * | 9/1999 | Niimi | H02K 1/17 | 310/154.43 |
| 6,225,722 B1 * | 5/2001 | Rupp | H02K 21/22 | 310/91 |
| 6,305,989 B1 * | 10/2001 | Quadir | H01R 13/533 | 439/281 |
| 6,320,287 B1 * | 11/2001 | Watson | H02K 1/185 | 310/254.1 |
| 6,346,760 B1 * | 2/2002 | Boardman, IV | H02K 1/16 | 310/216.007 |
| 6,498,417 B2 * | 12/2002 | Fuller | H02K 1/185 | 310/216.113 |
| 6,713,930 B2 * | 3/2004 | Shah | H02K 1/16 | 310/179 |
| 6,720,699 B1 * | 4/2004 | Shah | H02K 1/16 | 310/182 |
| 6,856,064 B2 * | 2/2005 | Masumoto | H02K 15/024 | 310/216.008 |
| 6,866,487 B2 * | 3/2005 | Abe | B60H 1/3223 | 417/410.1 |
| 6,979,930 B2 * | 12/2005 | Harada | H02K 1/16 | 310/216.004 |
| 7,653,986 B2 * | 2/2010 | Majernik | H02K 1/185 | 29/50 |
| 7,827,668 B2 * | 11/2010 | McKee | E21B 17/02 | 285/256 |
| 7,847,444 B2 * | 12/2010 | Kingman | H02K 1/185 | 310/216.129 |
| 7,919,898 B2 * | 4/2011 | Wang | H02K 1/276 | 310/216.058 |
| 7,928,617 B2 * | 4/2011 | Tsukashima | G01D 5/2046 | 310/111 |
| 8,643,246 B2 * | 2/2014 | Allen | H02K 1/16 | 310/216.011 |
| 8,941,282 B2 * | 1/2015 | Allen | H02K 1/16 | 310/216.008 |
| 9,203,285 B2 * | 12/2015 | Alfermann | H02K 9/19 | |
| 9,263,921 B2 * | 2/2016 | Tanavde | H02K 1/16 | |
| 9,496,765 B2 * | 11/2016 | Zheng | H02K 5/15 | |
| 9,509,182 B2 * | 11/2016 | Yamarthi | H02K 1/185 | |
| 10,112,231 B2 * | 10/2018 | Handwerker | B23K 20/122 | |
| 2001/0038797 A1 * | 11/2001 | Makino | F04C 18/0215 | 417/410.1 |
| 2003/0184182 A1 * | 10/2003 | Smith, Jr. | H02K 1/148 | 310/216.084 |
| 2003/0214197 A1 * | 11/2003 | De Luca | H02K 1/148 | 310/216.084 |
| 2004/0217669 A1 * | 11/2004 | Fujii | H02K 1/148 | 310/216.045 |
| 2005/0034295 A1 * | 2/2005 | Meacham | F16C 32/0468 | 29/598 |
| 2006/0071574 A1 * | 4/2006 | Stewart | H02K 1/146 | 310/216.132 |
| 2009/0289522 A1 * | 11/2009 | Buban | H02K 1/148 | 310/216.113 |
| 2010/0021321 A1 * | 1/2010 | Koike | F04B 39/0044 | 417/410.3 |
| 2010/0135830 A1 * | 6/2010 | Yasuda | H02K 1/185 | 417/410.1 |
| 2010/0308687 A1 * | 12/2010 | George | H02K 1/185 | 310/216.135 |
| 2011/0121680 A1 * | 5/2011 | Boardman, IV | H02K 1/185 | 310/216.129 |
| 2012/0153749 A1 * | 6/2012 | Chun | H02K 1/185 | 310/59 |
| 2013/0089428 A1 * | 4/2013 | Hottier | B21K 3/04 | 416/223 R |
| 2013/0106252 A1 * | 5/2013 | Yanagida | H02K 11/225 | 310/68 B |
| 2013/0140939 A1 * | 6/2013 | Asaga | H02K 1/276 | 310/216.129 |
| 2013/0187517 A1 * | 7/2013 | Asao | H02K 1/185 | 310/68 D |
| 2013/0313922 A1 * | 11/2013 | Kim | H02K 1/12 | 310/44 |
| 2014/0197715 A1 * | 7/2014 | Roopnarine | H02K 1/148 | 310/60 R |
| 2014/0231483 A1 * | 8/2014 | Takaichi | H02K 15/03 | 225/1 |
| 2014/0265683 A1 * | 9/2014 | Hossain | H02K 1/185 | 310/89 |
| 2014/0354107 A1 * | 12/2014 | Alfermann | H02K 15/14 | 310/216.113 |
| 2014/0360334 A1 * | 12/2014 | Singer-Schnoeller | B23B 31/11 | 83/698.11 |
| 2015/0000114 A1 * | 1/2015 | Matsushita | H01F 41/0266 | 29/607 |
| 2015/0022051 A1 * | 1/2015 | Meng | B29C 45/0053 | 310/216.001 |
| 2015/0069865 A1 * | 3/2015 | Alfermann | H02K 9/19 | 310/54 |
| 2015/0143691 A1 * | 5/2015 | Takaichi | H02K 15/03 | 29/738 |
| 2015/0222151 A1 * | 8/2015 | Semken | H02K 1/185 | 310/216.008 |
| 2016/0079817 A1 * | 3/2016 | Hayashi | H02K 1/22 | 310/156.53 |
| 2016/0285324 A1 * | 9/2016 | Carrasco | H02K 5/04 | |
| 2016/0285342 A1 * | 9/2016 | Carrasco | H02K 1/185 | |
| 2017/0182587 A1 * | 6/2017 | Tokoro | B23K 20/129 | |
| 2017/0313283 A1 * | 11/2017 | Kojima | B60S 1/08 | |
| 2018/0043420 A1 * | 2/2018 | Handwerker | B23K 20/1275 | |
| 2018/0248439 A1 * | 8/2018 | McGrew, Jr. | H02K 1/185 | |

FOREIGN PATENT DOCUMENTS

| | | |
|---|---|---|
| CN | 105324915 A | 2/2016 |
| DE | 19902837 C1 | 8/2000 |
| DE | 10144653 A1 | 4/2003 |

(56) References Cited

FOREIGN PATENT DOCUMENTS

| DE | 10258456 A1 | | 7/2004 | |
|----|----|----|----|----|
| DE | 102011085051 A1 | | 4/2013 | |
| EP | 3070815 A1 | | 9/2016 | |
| JP | H07-009070 U | | 2/1995 | |
| JP | 2005-354870 A | | 12/2005 | |
| JP | 2008199711 A | | 8/2008 | |
| JP | 2009-174395 A | | 8/2009 | |
| JP | 2010178598 | * | 1/2010 | ............ H02K 1/185 |
| JP | 2010-178589 A | | 8/2010 | |
| JP | 2010-178598 A | | 8/2010 | |
| JP | 2013-220030 A | | 10/2013 | |
| JP | 2016-086579 A | | 5/2016 | |
| WO | 2016/131556 A1 | | 8/2016 | |

OTHER PUBLICATIONS

An Office Action mailed by the Japanese Patent Office dated Feb. 26, 2019, which corresponds to Japanese Patent Application No. 2017-106715 and is related to U.S. Appl. No. 15/978,228; with partial English translation.

An Office Action mailed by the State Intellectual Property Office of the People's Republic of China dated Aug. 19, 2019, which corresponds to Chinese Patent Application No. 201810521134.6 and is related to U.S. Appl. No. 15/978,228; with English language translation.

An Office Action mailed by the German Patent Office dated Apr. 9, 2020, which corresponds to German Patent Application No. 102018003837.9 and is related to U.S. Appl. No. 15/978,228; with partial English language translation.

* cited by examiner

ROTARY ELECTRIC MACHINE WITH A STATOR HAVE A FRAME AND A CORE WITH HAVING THEIR MATERIAL MIXED AT JOINT

This application is based on and claims the benefit of priority from Japanese Patent Application No. 2017-106715, filed on May 30, 2017, the content of which is incorporated herein by reference.

BACKGROUND OF THE INVENTION

Field of the Invention

The present invention relates to a stator and a rotary electric machine including the stator.

Related Art

In a rotary electric machine including a rotor and a stator, the stator is constructed of a core in which a winding is arranged, and a stator frame attached to the outer lateral surface of the core. The core is required to be fixed tightly to the stator frame in order to receive counterforce generated by the torque of the rotor. A method called hot-fitting is known as one of methods or fixing the core to the stator frame. Hot-fitting is a method by which the stator frame is thermally expanded by heating in order to increase the inner diameter of the stator frame, the core is fitted into the stator frame, and then the stator frame is cooled, thereby fitting the shrunk stator frame and the core with each other (see patent document 1, for example).

Patent Document 1: Japanese Unexamined Utility Model Application, Publication. No. H07-9070

SUMMARY OF THE INVENTION

Fitting the stator frame and the core with each other by hot-fitting increases iron loss resulting from compressive stress generated when the stator frame is shrunk, thereby degrading the efficiency of the rotary electric machine. The fitting with the core also causes distortion of the stator frame, reducing the dimensional accuracy of the stator. Such troubles might also occur in a method by which the core is cooled to be shrunk with heat to reduce the outer diameter of the core, and the core in this state is fitted into the stator frame (cold-fitting).

The present invention is intended to provide a stator inhibiting efficiency degradation of the rotary electric machine and having excellent dimensional accuracy and a rotary electric machine including the stator.

(1) The present invention relates to a stator (stator 20 described later, for example) comprising: a substantially cylindrical core (core 21 described later, for example) allowing arrangement of a winding inside the core; and a stator frame (stator frame 22 described later, for example) joined to the outer lateral surface of the core through a joint (joint 24 described later, for example). The joint is formed at least at a part of a boundary where the outer lateral surface of the core and the inner lateral surface of the stator frame are in contact with each other. The material forming the core and the material forming the stator frame are mixed at the joint.

(2) In the stator described in (1), the joint may be formed discontinuously at the boundary where the outer lateral surface of the core and the inner lateral surface of the stator frame are in contact with each other.

(3) In the stator described in (1) or (2), the joint may be formed at a projection (projection 21a described later, for example) or at a recess (recess 21b described later, for example) at the outer lateral surface of the core, or the joint may be formed at both the projection and the recess.

(4) In the stator described in any one of (1) to (3), the core may have depressions (depressions 21c described later, for example) at a part of the outer lateral surface except the joint, and the depression may be filled with powder made of a material not contributing to the joining the core and the stator frame.

(5) In the stator described in (4), the powder (25) filling the depressions may have higher heat conductivity than the material forming the stator frame.

(6) The present invention further relates to a rotary electric machine (motor 1 described later, for example) comprising: the stator described in any one of (1) to (5); and a rotor (rotor 30 described later, for example) supported on a rotary axis (rotary axis 32 described later, for example) and provided on an inner circumferential side relative to the stator.

The present invention is capable of providing a stator and a rotary electric machine inhibiting efficiency degradation of the rotary electric machine and having excellent dimensional accuracy.

DETAILED DESCRIPTION OF THE INVENTION

Figure 1:
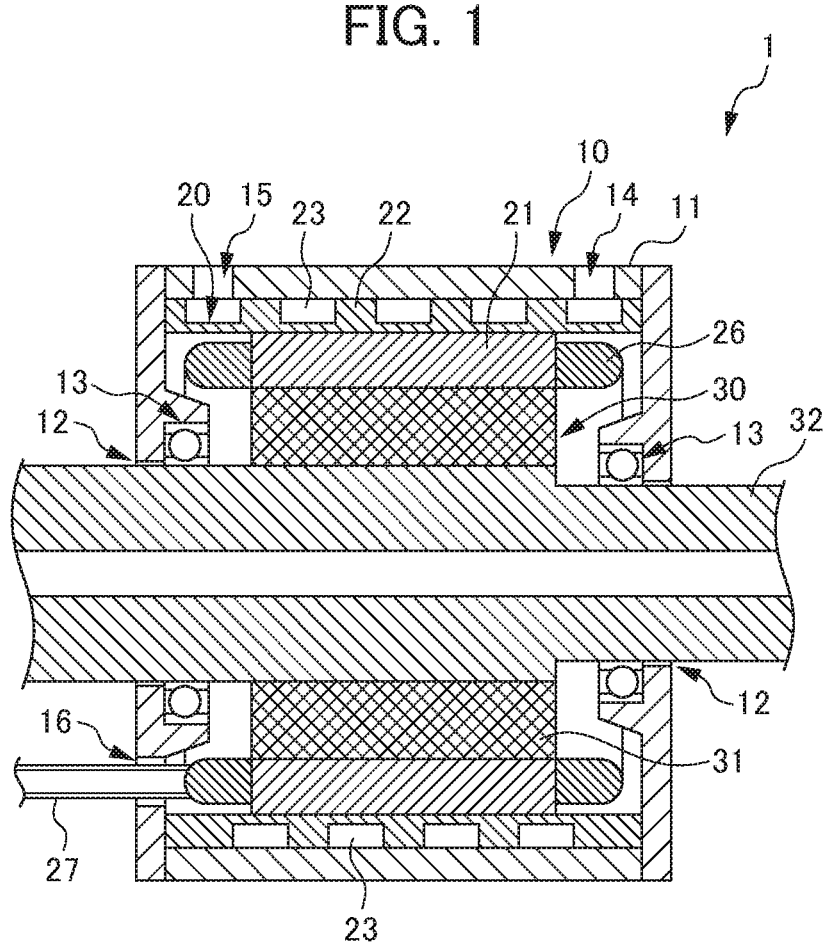
FIG. 1 is a sectional view explaining the configuration of a motor 1.

Embodiments of the present invention will be described below. All the drawings accompanying the present specification are schematic drawings. In consideration of the facilitation of understanding, etc., each part in the drawings is changed or exaggerated from the actual parts in shape, scale, dimensional aspect ratio, etc. Where appropriate, hatching showing a cross section of a member is omitted from the drawings.

First Embodiment

A motor 1 as a rotary electric machine including a stator of a first embodiment will be described first. FIG. 1 is a sectional view explaining the configuration of the motor 1 of the first embodiment. The configuration of the motor 1 shown in FIG. 1 is an example. The motor 1 may have any configuration as long as the stator of the present invention is applicable to the motor 1.

As shown in FIG. 1, the motor 1 includes a frame 10, a stator 20, and a rotor 30. The frame 10 is an exterior component of the motor 1 and includes a frame body 11, an axis hole 12, and a bearing 13. The frame body 11 is a housing that surrounds and holds the stator 20. The frame body 11 holds the rotor 30 through the bearing 13. The frame body 11 includes a supply port 14, a discharge port 15, and a hole part 16. The supply port 14 is an opening for supply of a coolant to a flow path 23 (described later) of a stator frame 22 and is connected to a supply pipe for the coolant (not shown in the drawings). The discharge port 15 is an opening for discharge of the coolant having passed through the flow path 23 and is connected to a discharge pipe for the coolant (not shown in the drawings). The hole part 16 is an opening for causing a power line 27 pulled out from a core 21 to pass through. The axis hole 12 is a hole where a rotary axis 32 (described later) passes through. The bearing 13 is a member that rotatably supports the rotary axis 32.

The stator 20 is a composite member that forms a rotating magnetic field for rotating the rotor 30. The stator 20 is formed into a circular cylindrical shape as a whole and fixed to the interior of the frame 10. The stator 20 includes the core 21 and the stator frame 22.

The core 21 is a member that allows arrangement of a winding 26 inside the core 21. The core 21 is formed into a circular cylindrical shape and arranged on the inner side of the stator 20. The core 21 has multiple grooves (not shown in the drawings) formed at the inner lateral surface of the core 21. The winding 26 is arranged in these grooves. Parts of the winding 26 protrude from the opposite end portions of the core 21 in the axis direction of the core 21. The core 21 is prepared by forming a stack by stacking multiple thin plates such as magnetic steel sheets, and unifying the stack by adhesion or swaging, for example.

The stator frame 22 is a member that holds the core 21 inside the stator frame 22. The stator frame 22 is formed into a circular cylindrical shape and arranged on the outer side of the stator 20. To receive counterforce generated by the torque of the rotor 30, the core 21 is joined tightly to the stator frame 22. As shown in FIG. 1, the stator frame 22 of this embodiment includes the flow path 23 for cooling the heat transferred from the core 21 formed at the outer lateral surface of the stator frame 22. The flow path 23 is a single-thread or multiple-thread spiral groove formed at the outer lateral surface of the stator frame 22. The coolant (not shown in the drawings) supplied through the supply port 14 of the frame body 11 (frame 10) passes through the flow path 23 so as to flow along the outer lateral surface of the stator frame 22 in a spiral pattern. Then, the coolant is discharged to the outside through the discharge port 15 of the frame body 11.

The stator frame 22 may be made of materials such as carbon steel, steel material for magnetic steel sheets, stainless steel, or aluminum, for example. As described later, the stator frame 22 is formed by additive manufacturing using these materials on the outer lateral surface of the core 21.

The power line 27 electrically connected to the winding 26 is pulled out from the core 21 of the stator 20. The power line 27 is connected to a power supply device (not shown in the drawings) installed outside the motor 1. While the motor 1 operates, a three-phase alternating current is supplied to the core 21, for example, thereby forming a rotating magnetic field for rotating the rotor 30.

The rotor 30 is a part to be rotated by magnetic interaction with the rotating magnetic field formed by the stator 20. The rotor 30 is provided on an inner circumferential side relative to the stator 20. The rotor 30 includes a rotor body 31 and the rotary axis 32. The rotor body 31 is a part that generates rotative force using the rotating magnetic field formed at the stator 20 and is constructed of multiple permanent magnets (not shown in the drawings).

The rotary axis 32 is a member that supports the rotor body 31. The rotary axis 32 is inserted so as to pass through the axis center of the rotor body 31 and is fixed to the rotor body 31. The rotary axis 32 is rotatably supported on the bearing 13 provided on the frame 10. The rotary axis 32 passes through the axis hole 12 to be connected to an external power transmission mechanism or an external deceleration mechanism (not shown in the drawings), for example.

In the motor 1 shown in FIG. 1, if a three-phase alternating current is supplied to the stator 20 (core 21), the rotor body 31 generates rotative force using the magnetic interaction between the stator 20 where the rotating magnetic field is formed and the rotor 30. This rotative force is output through the rotary axis 32 to the outside. In this embodiment, the motor 1 is described as a synchronous motor. Alternatively, the motor 1 may be an induction motor, for example.

Figure 2A:
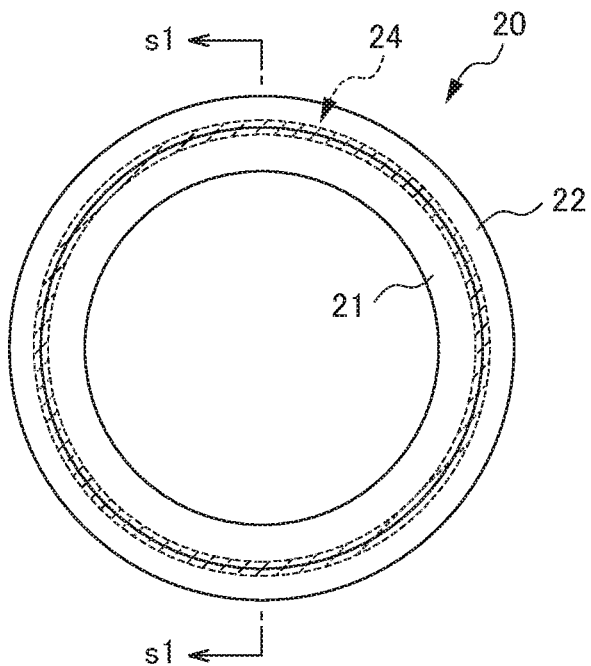
FIG. 2A shows a stator 20 of a first embodiment viewed from the axis direction.
Figure 2B:
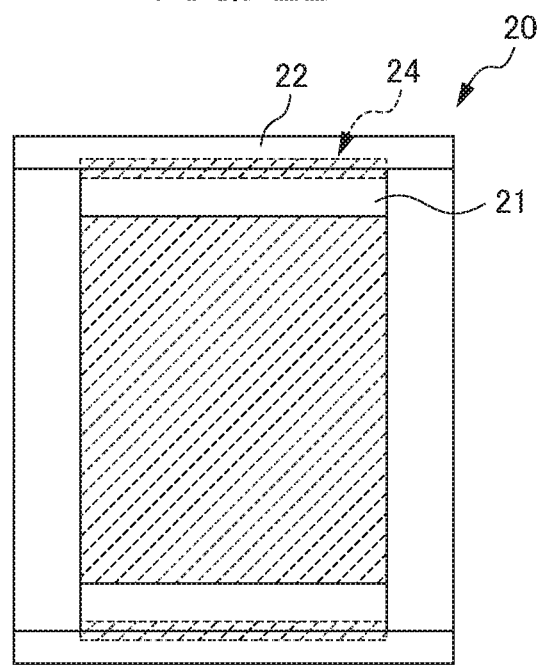
FIG. 2B is a sectional view takes along s1-s1 of FIG. 2A.

The stator 20 of the first embodiment will be described next. FIG. 2A shows the stator 20 of the first embodiment viewed from the axis direction. FIG. 2B is a sectional view taken along s1-s1 of FIG. 2A. In the drawings showing stators of corresponding embodiments described below, illustrations of parts such a groove formed at the inner lateral surface of the core 21, the winding 26 arranged in this groove, and the flow path 23 formed at the outer lateral surface of the stator frame 22 are omitted.

As shown in FIGS. 2A and 2B, in the stator 20 of the first embodiment, the outer lateral surface of the core 21 and the inner lateral surface of the stator frame 22 are joined at a joint 24 in the entire area of a boundary where these lateral surfaces are in contact with each other. The joint 24 is an area where a material forming the core 21 and a material forming the stator frame 22 are mixed. Being "mixed" mentioned herein includes not only a state where metals are fused with each other but also a state where resin or resin containing metal gets into fine irregularities (flash) formed in a surface of metal, etc. Specifically, being "mixed" means a state where materials of the same type or different types are inseparably united.

The joint 24 is formed by additive manufacturing using the material forming the stator frame 22 on the outer lateral surface of the core 21. For additive manufacturing of the stator frame 22, metal 3D printers conforming to selective laser melting (SLM), electron beam melting (EBM), or directed energy deposition (DED) are usable, for example.

Additive manufacturing using the metal 3D printer proceeds as follows, for example. The core 21 is placed on a formation table. Powder of the material (carbon steel, for example) forming the stator frame 22 is spread over the formation table. A laser beam is applied from above the powder to fuse and solidify a part illuminated with the laser, thereby forming a metal layer of some tens of micrometers. This process is performed repeatedly in the axis direction of the core 21 to stack substantially annular metal layers along the outer lateral surface of the core 21. By doing so, the stator frame 22 continuously joined to the outer lateral surface of the core 21 can be formed. During the formation of the stator frame 22, the shaped structures necessary for the stator frame 22 including the foregoing flow path 23 as a spiral groove (see FIG. 1) can be formed together. In the present invention, "powder" covers not only "powder" in a narrow sense which means an aggregate of fine solid particles but also "powder" in a wide sense which means an aggregate of relatively coarse solid particles.

In the foregoing process of additive manufacturing, during application of a laser beam to the powder spread over the table, by further applying a laser beam to a part where the core 21 contacts the powder, the powder and the material forming the core 21 at this part are fused with each other and solidified. In this way, the joint 24 where the material forming the core 21 and the material forming the stator frame 22 are mixed can be formed simultaneously with the foregoing metal layer. A part of the stator frame 22 except the joint 24 is a metal layer formed by fusing and solidifying only the material forming the stator frame 22.

To form the stator frame 22 more accurately using the metal 3D printer, the shape of the core 21 is preferably acquired as 3D data (CAD or CG data) by measuring the shape of the core 21 using a 3D scanner (three-dimensional measuring instrument), for example. By adjusting the thickness of each layer of the stator frame 22 in the radial direction using such 3D data, the stator frame 22 having a more accurate shape can be formed without being affected by the surface shape (with irregularities, etc.) of the core 21.

The stator 20 of the first embodiment described above achieves the following effects, for example. In the stator 20 of the first embodiment, unlike in the case of hot-fitting, compressive stress does not act on the core 21 during joining of the outer lateral surface of the core 21 and the inner lateral surface of the stator frame 22. Thus, efficiency degradation of the motor 1 due to increased iron loss is inhibited. Additionally, in the stator 20 of the first embodiment, the stator frame 22 is not distorted during formation of the stator frame 22 on the outer circumferential surface of the core 21, thereby inhibiting reduction in dimensional accuracy.

In the case of hot-fitting, for example, when a stator frame in which the core is fitted is cooled, parts of the stator frame not contacting the core (mainly, opposite end portions in the axis direction) tapers off compared to the part contacting the core. This reduces parallelism at the end surfaces of the stator in the axis direction, bringing about the need to polish these end surfaces. By contrast, in the configuration of the first embodiment, distortion does not occur during formation of the stator frame 22, thus making it possible to maintain parallelism at the end surfaces of the stator frame 22 in the axis direction. Thus, the stator 20 of the first embodiment does not require polishing of the end surfaces after formation of the stator frame 22. As a result, the stator 20 inhibiting efficiency degradation of the motor 1 and having excellent, dimensional accuracy can be obtained by the configuration of the first embodiment.

If a core is fitted into a stator frame by hot-fitting, the fixing power between the core and the stator frame is maintained by the thickness of the contact surface between the core and the stator frame. By contrast, in the stator 20 of the first embodiment, the fixing power between the core 21 and the stator frame 22 is maintained by the strengths of the materials at the joint 24. Thus, in the stator 20 of the first embodiment, the core 21 and the stator frame 22 can be fixed more tightly than in the case of hot-fitting.

In the axis direction of the stator 20, formation of the joint 24 is not limited to the range between one end portion. and the opposite end portion of the core 21. As long as sufficient fixing power can be ensured between the core 21 and the stator frame 22, the joint 24 may be formed solely in the area excluding the opposite end portions of the core 21.

The configuration of the first embodiment further achieves the following effects. In the stator 20 of the first embodiment, the inner diameter of the stator frame 22 is does not need to be increased by heating, unlike in the case of hot-fitting. This eliminates the need to prepare facilities such as an electric furnace. In the stator 20 of the first embodiment, steps such as the heating step, the fitting step, and the cooling step can be omitted from the manufacturing stages. Thus, manufacturing time can be shortened. Further, eliminating the need for a fitting step can reduce the incidence of defective parts due to fitting errors, for example.

Thin plates such as magnetic steel sheets forming the core 21 are manufactured by press working (punching). Hence, irregularities (flash) are likely to occur at the outer lateral surface. If irregularities occur at the outer lateral surface of a core, it may reduce the dimensional accuracy of the outer circumferential surface of the core at these irregularities, or result in the formation of a part between the core and a stator frame where the core and the stator frame do not are in contact with each other. Hence, to increase dimensional accuracy or heat conductivity between the core and the stator frame, it has conventionally been required to polish the outer lateral surface of the core. In the step of polishing the outer lateral surface of the core, tolerance should be limited to a range not exceeding some tens of micrometers. However, limiting tolerance within this range has been difficult for some products and this has caused yield reduction. By contrast, in the stator 20 of the first embodiment, the outer lateral surface of the core 21 does not need to be polished. This is advantageous not only in shortening the manufacturing time but also in increasing yield. The foregoing effects achieved by the configuration of the first embodiment are common to respective configurations of the second to sixth embodiments described later.

Second Embodiment

Figure 3A:
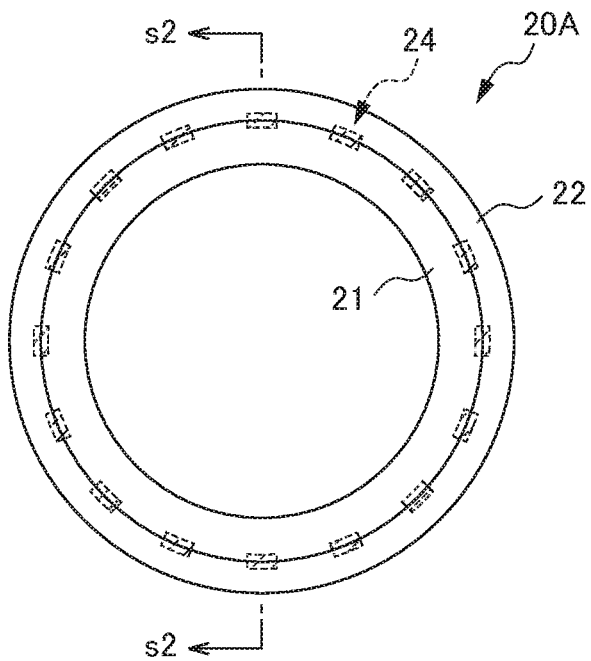
FIG. 3A shows a stator 20A of a second embodiment viewed from the axis direction.
Figure 3B:
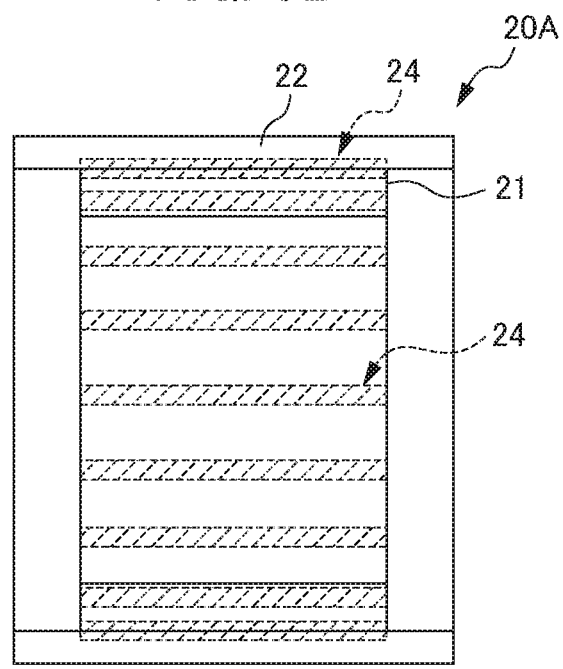
FIG. 3B is a sectional view taken along s2-s2 of FIG. 3A.

A stator 20A of a second embodiment will be described next. FIG. 3A shows the stator 20A of the second embodiment viewed from the axis direction. FIG. 3B is a sectional view taken along s2-s2 of FIG. 3A. The stator 20A of the second embodiment differs from the first embodiment in that multiple joints 24 are formed discontinuously at a boundary where the outer lateral surface of the core 21 and the inner lateral surface of the stator frame 22 are in contact with each other. The other structures of the stator 20A of the second embodiment are equal to those of the first embodiment. Thus, in the description and drawings of the second embodiment, a structure such as a member comparable to that of the first embodiment will be explained and illustrated by being given the same sign as in the first embodiment, and overlapping descriptions will not be given.

As shown in FIGS. 3A and 3B, in the stator 20A of the second embodiment, the outer lateral surface of the core 21 and the inner lateral surface of the stator frame 22 are joined in the circumferential direction of the stator 20A by the multiple joints 24. As shown in FIG. 3A, all the joints 24 are formed at regular intervals in the circumferential direction of the stator 20A. As shown in FIG. 3B, each joint 24 extends in the axis direction of the stator 20A. The joints 24 extend in the axis direction of the stator 20A within the range from one end portion to the opposite end portion of the core 21 in the axis direction of the stator 20A. At the parts between the outer lateral surface of the core 21 and the inner lateral surface of the stator frame 22 where the joints 24 are not formed, the outer lateral surface of the core 21 and the inner lateral surface of the stator frame 22 are in contact with each other without being mixed.

In the stator 20A of the second embodiment, the multiple joints 24 are formed discontinuously at the boundary where the outer lateral surface of the core 21 and the inner lateral surface of the stator frame 22 are in contact with each other. Thus, compared to the first embodiment where the joint 24 is formed in the entire area of this boundary, in the stator 20A of the second embodiment, the time needed for forming the stator frame 22 can be shortened. Further, in the stator 20A of the second embodiment, a laser beam is applied to a smaller range of the boundary where the outer lateral surface of the core 21 and the inner lateral surface of the stator frame 22 are in contact with each other. This makes it possible to inhibit deformation of the stator frame 22 due to thermal shrinkage which occurs when the stator frame 22 cooled after the formation of the stator frame 22.

As shown in FIG. 3A, in the example described in the second embodiment, the joints 24 are formed at 16 positions separated in the circumferential direction of the stator 20A. However, this is not the only case. The number of the joints 24 and the width of the joint 24 in the circumferential direction may be set in any way, as long as sufficient fixing power can be ensured between the core 21 and the stator frame 22. Formation of the joint 24 is not limited to the range from one end portion to the opposite end portion of the core 21 in the axis direction of the stator 20A. The joint 24 may be formed solely in the area excluding the opposite end portions of the core 21, as long as sufficient fixing power can be ensured between the core 21 and the stator frame 22.

Third Embodiment

Figure 4A:
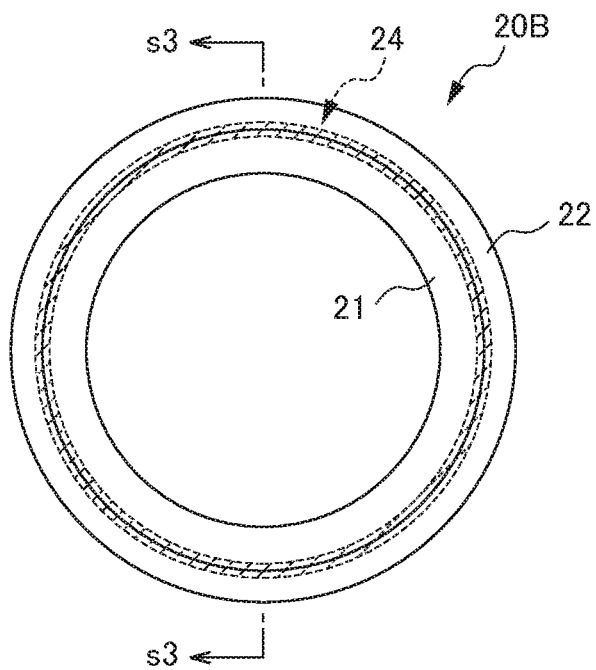
FIG. 4A shows a stator 20B of a third embodiment viewed from the axis direction.
Figure 4B:
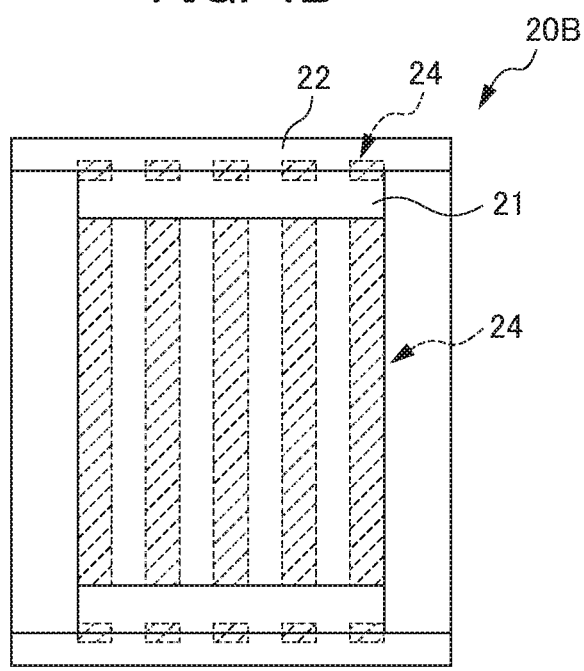
FIG. 4B is a sectional view taken along s3-s3 of FIG. 4A.

A stator 20B of a third embodiment will be described next. FIG. 4A shows the stator 20B of the third embodiment viewed from the axis direction. FIG. 4B is a sectional view taken along s3-s3 of FIG. 4A. Like the second embodiment, the stator 20B of the third embodiment differs from the first embodiment in that multiple joints 24 are formed discontinuously at a boundary where the outer lateral surface of the core 21 and the inner lateral surface of the stator frame 22 are in contact with each other. The other structures of the stator 20B of the third embodiment are equal to those of the first embodiment. Thus, in the description and drawings of the third embodiment, a structure such as a member comparable to that of the first embodiment will be explained and illustrated by being given the same sign as in the first embodiment, and overlapping descriptions will not be given.

As shown in FIGS. 4A and 4B, in the stator 20B of the third embodiment, the outer lateral surface of the core 21 and the inner lateral surface of the stator frame 22 are joined by the multiple joints 24 separated in the axis direction of the stator 20B. As shown in FIG. 4A, each joint 24 is formed to extend in the circumferential direction of the stator 20B. As shown in FIG. 4B, all the joints 24 are formed at regular intervals in the axis direction of the stator 20B. The joints 24 are formed in the axis direction of the stator 20B within the range from one end portion to the opposite end portion of the core 21 in the axis direction of the stator 20B. At the parts between the outer lateral surface of the core 21 and the inner lateral surface of the stator frame 22 where the joints 24 are not formed, the outer lateral surface of the core 21 and the inner lateral surface of the stator frame 22 are in contact with each other without being mixed.

Like that of the second embodiment, the stator 20B of the third embodiment achieves the effects of shortening time of forming the stator frame 22, and inhibiting deformation of the stator frame 22 due to thermal shrinkage. As shown in FIG. 4B, in the example described in the third embodiment, the joints 24 are formed at five positions separated in the axis direction of the stator 20B. However, this is not the only case. The number of the joints 24 and the width of the joint 24 in the axis direction may be set in any way, as long as sufficient fixing power can be ensured between the core 21 and the stator frame 22. Formation of the joint 24 is not limited to the range from one end portion to the opposite end portion of the core 21 in the axis direction of the stator 20B. The joint 24 may be formed solely in the area excluding the opposite end portions of the core 21, as long as sufficient fixing power can be ensured between the core 21 and the stator frame 22.

Fourth Embodiment

Figure 5A:
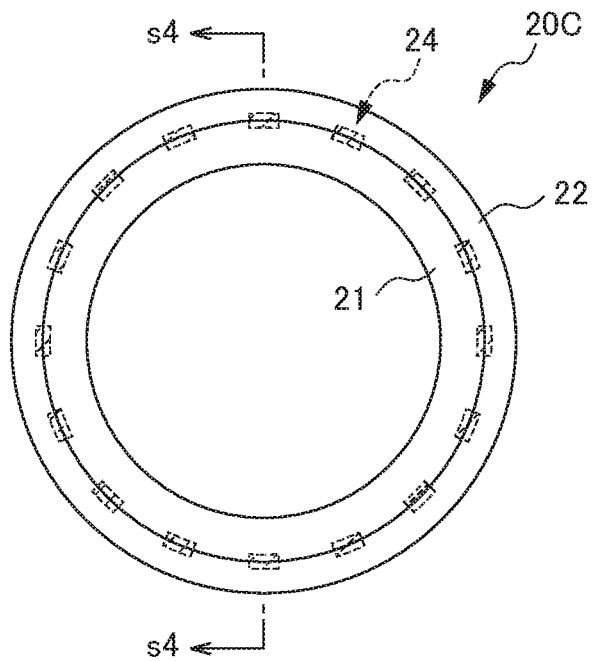
FIG. 5A shows a stator 20C of a fourth embodiment viewed from the axis direction.
Figure 5B:
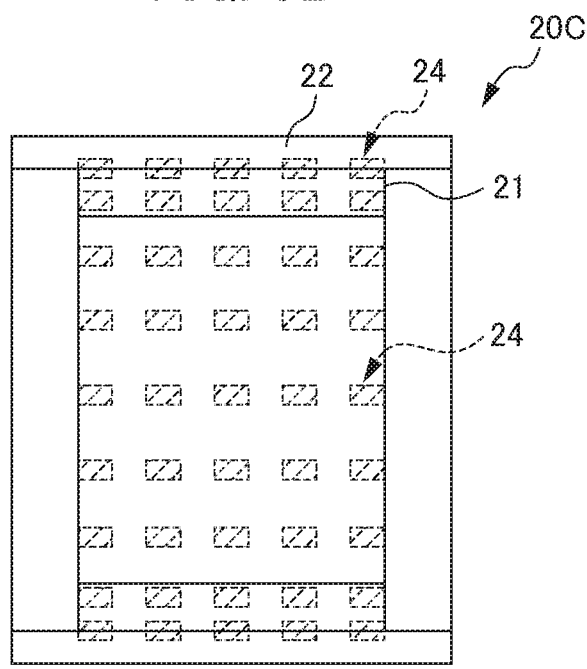
FIG. 5B is a sectional view taken along s4-s4 of FIG. 5A.

A stator 20C of a fourth embodiment will be described next. FIG. 5A shows the stator 20C of the fourth embodiment viewed from the axis direction. FIG. 5B is a sectional view taken along s4-s4 of FIG. 5A. Like the second embodiment, the stator 20C of the fourth embodiment differs from the first embodiment in that multiple joints 24 are formed discontinuously at a boundary where the outer lateral surface of the core 21 and the inner lateral surface of the stator frame 22 are in contact with each other. The other structures of the stator 200 of the fourth embodiment are equal to those of the first embodiment. Thus, in the description and drawings of the fourth embodiment, a structure such as a member comparable to that of the first embodiment will be explained and illustrated by being given the same sign as in the first embodiment, and overlapping descriptions will not be given.

As shown in FIGS. 5A and 5B, in the stator 200 of the fourth embodiment, the outer lateral surface of the core 21 and the inner lateral surface of the stator frame 22 are joined by the multiple joints 24 separated in the circumferential direction and the axis direction of the stator 20C. More specifically, as shown in FIG. 5B, the joints 24 are formed in a latticed pattern at the boundary where the outer lateral surface of the core 21 and the inner lateral surface of the stator frame 22 are in contact with each other.

As shown in FIG. 5B, the joints 24 are formed in the axis direction of the stator 20C within the range from one end portion to the opposite end portion of the core 21 in the axis direction of the stator 20C. At the parts between the outer lateral surface of the core 21 and the inner lateral surface of the stator frame 22 where the joints 24 are not formed, the outer latera surface of the core 21 and the inner lateral surface of the stator frame 22 are in contact with each other without being mixed.

Like that of the second embodiment, the stator 20C of the fourth embodiment achieves the effects of shortening time of forming the stator frame 22, and inhibiting deformation of the stator frame 22 due to thermal shrinkage. As shown in FIG. 5B, in the example described in the fourth embodiment, the joints 24 are formed in a latticed pattern at the boundary where the outer lateral surface of the core 21 and the inner lateral surface of the stator frame 22 are in contact with each other. However, this is not the only case. The shape of each joint 24 and the pattern for forming the joints 24 may be set in any way, as long as sufficient fixing power can be ensured between the core 21 and the stator frame 22. Formation of the joint 24 is not limited to the range from one end portion to the opposite end portion of the core 21 in the axis direction of the stator 20C. The joint 24 may be formed solely in the area excluding the opposite end portions of the core 21, as long as sufficient fixing power can be ensured between the core 21 and the stator frame 22.

Fifth Embodiment

Figure 6A:
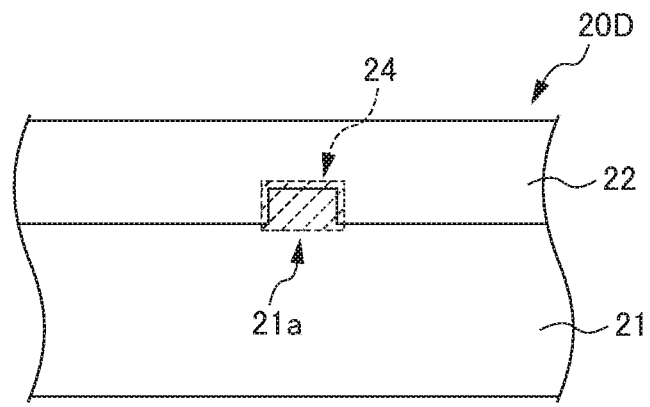
FIG. 6A is a partial sectional view showing a first form of a stator 20D of a fifth embodiment.
Figure 6B:
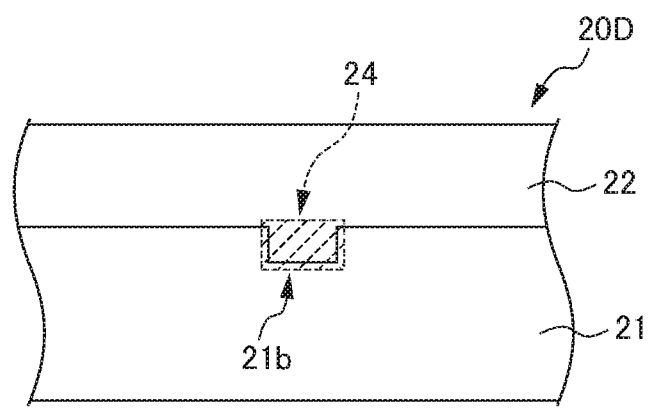
FIG. 6B is a partial sectional view showing a second form of the stator 20D of the fifth embodiment.
Figure 6C:
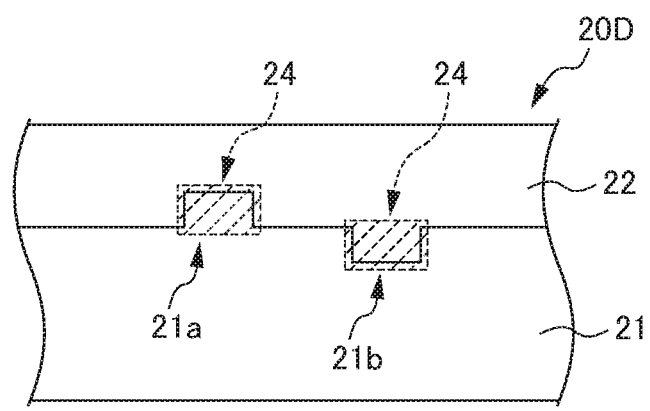
FIG. 6C is a partial sectional view showing a third form of the stator 200 of the fifth embodiment.

A stator 20D of a fifth embodiment will be described next. FIG. 6A is a partial sectional view showing a first form of the stator 20D of the fifth embodiment. FIG. 6B is a partial sectional view showing a second form of the stator 20D of the fifth embodiment. FIG. 6C is a partial sectional view showing a third form of the stator 20D of the fifth embodiment. Each of the sectional views in FIGS. 6A to 6C is taken at a plane parallel to the axis direction of the stator 20D and shows a part of the boundary where the outer lateral surface of the core 21 and the inner lateral surface of the stator frame 22 are in contact with each other.

The stator 20D of the fifth embodiment differs from the first embodiment in the configuration of the joint 24. The other structures of the stator 20D of the fifth embodiment are equal to those of the first embodiment. Thus, in the description and drawings of the fifth embodiment, a structure such as a member comparable to that of the first embodiment will be explained and illustrated by being given the same sign as in the first embodiment, and overlapping descriptions will not be given.

In the first form shown in FIG. 6A, the joint 24 is formed between a projection 21a formed at a part of the outer lateral surface of the core 21 and the stator frame 22 contacting the projection 21a. As described above, the core 21 is formed by stacking thin plates such as magnetic steel sheets. Hence, irregularities (flash) are likely to occur at the outer lateral surface. By using the projection 21a which, among the abovementioned irregularities, projects outward from the outer lateral surface as the joint 24, heat resulting from application of a laser beam is less likely to escape than in the case of using a flat boundary where the outer lateral surface of the core 21 and the inner lateral surface of the stator frame 22 are in contact with each other as the joint 24. Thus, metals can be fused with each other more rapidly.

In the second form shown in FIG. 6B, the joint 24 is formed between a recess 21b formed at a part of the outer lateral surface of the core 21 and the stator frame 22 contacting the recess 21b. In the third form shown in FIG. 6C, the joint 24 is formed between the projection 21a formed at a part of the outer lateral surface of the core 21 and the stator frame 22 contacting the projection 21a, and also between the recess 21b formed at a part of the outer lateral surface of the core 21 and the stator frame 22 contacting the recess 21b.

Multiple projections 21a and multiple recesses 21b may be formed in the axis direction on the outer lateral surface of the core 21. In this case, the outer lateral surface of the core 21 has a stepped shape or a wave-like shape. If the outer lateral surface of the core 21 has a stepped shape or a wave-like shape, the joint 24 shown in each of the first to third forms of the fifth embodiment may be formed continuously or intermittently.

Sixth Embodiment

Figure 7:
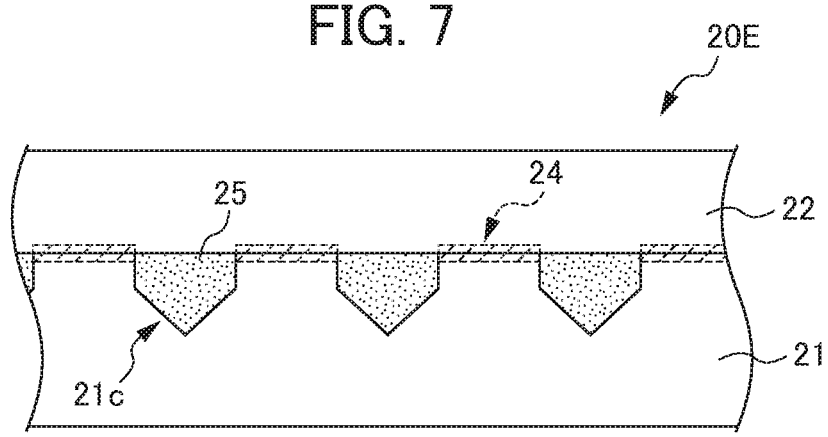
FIG. 7 is a partial sectional view showing a stator 20E of a sixth embodiment.

A stator 20E of a sixth embodiment will be described next FIG. 7 is a partial sectional view showing the stator 20E of the sixth embodiment. The sectional view in FIG. 7 is taken at a plane parallel to the axis direction of the stator 20E and shows a part of a boundary where the outer lateral surface of the core 21 and the inner lateral surface of the stator frame 22 are in contact with each other. The stator 20E of the sixth embodiment differs from the first embodiment in the configuration of the stator 20E except the joint 24. The other structures of the stator 20E of the sixth embodiment are equal to those of the first embodiment. Thus, in the description and drawings of the sixth embodiment, a structure such as a member comparable to that of the first embodiment will be explained and illustrated by being given the same sign as in the first embodiment, and overlapping descriptions will not be given.

As shown in FIG. 7, in the stator 20E of the sixth embodiment, the space between depressions 21c formed at the outer lateral surface of the core 21 an the inner lateral surface of the stator frame 22 is filled with powder 25. The depressions 21c may be recesses formed at the outer lateral surface of the core 21 when thin plates such as magnetic steel sheets forming the core 21 are manufactured by press working. Alternatively, the depressions 21c may be formed intentionally. In the example illustrated in FIG. 7, the depressions 21c have a triangular shape with an inwardly-directed sharp point. However, the depressions 21c can take various shapes and are not limited to the shape shown in the example of FIG. 7. The depressions 21c may be formed with regularity or at random at the outer lateral surface of the core 21. The powder 25 is made of the same material as the material forming the stator frame 22 (carbon steel, for example).

As described above, a laser beam is applied to the joint 24 during formation of the stator frame 22. Thus, the powder of the material forming the stator frame 22 is fused with the core 21 at the joint 24. Meanwhile, by avoiding application of laser beams to parts corresponding to the depression 21c, the powder 25 which is not to be fused can stay in the space within the depressions 21c. By doing so, the interior of the depressions 21c can be filled with the powder 25 not contributing to the joining between the core 21 and the stator frame 22.

In the stator 20E of this embodiment, if counterforce generated by the torque of the rotor 30 (see FIG. 1) acts on the core 21, this counterforce can be received more firmly by the frictional force of the powder 25 filling the depressions 21c. Thus, even if the joint 24 has a part where the joining is imperfect, the reduction in fixing power at said part can be compensated for by the frictional force of the powder 25 filling the depressions 21c.

The powder 25 filing the depressions 21r s not limited to powder made of the same material as the material forming the stator frame 22. For example, the powder 25 for filling may be made of a material having larger frictional force than the material forming the stator frame 22. In this case, frictional force can be further increased in the depressions 21c. The powder 25 may be made of a material having higher heat conductivity than the material forming the stator frame 22. In this case, heat is conducted from the core 21 to the stator frame 22 with higher conductivity to allow for increase in cooling efficiency.

An example of the material having higher heat conductivity than the material forming the stator frame 22 is aluminum. After formation of the stator frame 22 on the outer lateral surface of the core 21, a gap formed between the outer lateral surface of the core 21 and the inner lateral surface of the stator frame 22 may be filled with the powder 25. In this case, the gap between the core 21 and the stator frame 22 functions as the depression 21c. The depressions 21c may be formed at the inner lateral surface of the stator frame 22. Alternatively, the depressions 21c may be formed at each of the outer lateral surface of the core 21 and the inner lateral surface of the stator frame 22.

The present invention is not limited to the embodiments of the present invention described above. As in modifications described later, various modifications or changes are applicable to the present invention and such modifications or changes are also within the technical scope of the present invention. The effects described in the embodiments are merely a list of most preferable effects resulting from the present invention. Effects achieved by the present invention are not limited to those described in the embodiments. While not described in detail, the embodiments described above and the modifications described below can be used in combination, where appropriate. The following description includes structures common to those of each of the embodiments. Hence, members will be described without signs.

Modifications

In the example described in the embodiments, the powder of metals such as carbon steel is used as the material for forming the stator frame. However, this is not the only case. The material forming the stator frame may be resin, or a mixture of resin and metal. Resin usable as the material forming the stator frame is epoxy resin, for example.

In the example described in the embodiments, the stator frame has a circular cylindrical shape. However, this is not the only case. If the stator frame is formed by additive manufacturing, the shape of the stator frame is determined independently of the shape of the core. Thus, the stator frame may have a cylindrical shape with a cross section other than a circle such as an ellipse or a rectangle, for example. In the example described in the embodiments, the core is a stack formed by stacking multiple thin plates such as magnetic steel sheets. However, this is not the only case. The core may have any configuration and may be obtained by any manufacturing method.

In the example described in the embodiments, a metal 3D printer is used as means for forming the stator frame by additive manufacturing. However, this is not the only case. A metal lamination device employing laser engineered net shaping (LENS), where an intended part is fused and a stack is formed by simultaneously applying material powder and a laser beam, is usable as means for forming the stator frame by additive manufacturing, for example. In the example described in the embodiments, the rotary electric machine to which the stator of the present invention is applicable is a motor. However, this is not the only case. The rotary electric machine may be a power generator.

EXPLANATION OF REFERENCE NUMERALS

1: Motor, 10: Frame, 20 (20A to 20E): Stator, 21: Core, 21a: Projection, 21b: Recess, 21c: Depression, 22: Stator frame, 24: Joint, 25: Powder, 30: Rotor, 32: Rotary axis

What is claimed is:

1. A stator comprising:
a substantially cylindrical core allowing arrangement of a winding inside the core; and
a stator frame joined to the outer lateral surface of the core through a joint,
wherein the joint is formed at least at a part of a boundary where the outer lateral surface of the core and the inner lateral surface of the stator frame are in contact with each other,
a material forming the core and a material forming the stator frame are mixed at the joint,
the material forming the stator frame includes a powder material that gets into irregularities formed in a surface of the core at the joint, and
the joint is not exposed anywhere at an outer circumferential surface of the stator frame.

2. The stator according to claim 1, wherein the joint is formed discontinuously at the boundary where the outer lateral surface of the core and the inner lateral surface of the stator frame are in contact with each other.

3. The stator according to claim 1, wherein the joint is formed at a projection or at a recess at the outer lateral surface of the core,
or the joint is formed at both the projection and the recess.

4. A rotary electric machine comprising:
the stator according to claim 1; and
a rotor supported on a rotary axis and provided on an inner circumferential side relative to the stator.

5. The stator according to claim 1, wherein the core has depressions at a part of the outer lateral surface except the joint, and
the depressions are filled with powder made of a material not contributing to joining the core and the stator frame.

6. The stator according to claim 5, wherein the powder filling the depressions has higher heat conductivity than the material forming the stator frame.

* * * * *